(12) United States Patent
Lee et al.

(10) Patent No.: US 9,783,867 B2
(45) Date of Patent: Oct. 10, 2017

(54) METHOD AND APPARATUS FOR CONTROLLING THE STRIP TEMPERATURE OF THE RAPID COOLING SECTION OF A CONTINUOUS ANNEALING LINE

(71) Applicant: POSCO, Pohang-si (KR)

(72) Inventors: Gyoo Taek Lee, Gwangyang-si (KR); Jung Hun Park, Gwangyang-si (KR)

(73) Assignee: POSCO, Pohang-si (KR)

( * ) Notice: Subject to any disclaimer, the term of this patent is extended or adjusted under 35 U.S.C. 154(b) by 573 days.

(21) Appl. No.: 14/364,944

(22) PCT Filed: Dec. 12, 2012

(86) PCT No.: PCT/KR2012/010776
§ 371 (c)(1),
(2) Date: Jun. 12, 2014

(87) PCT Pub. No.: WO2013/089422
PCT Pub. Date: Jun. 20, 2013

(65) Prior Publication Data
US 2014/0350746 A1   Nov. 27, 2014

(30) Foreign Application Priority Data

Dec. 15, 2011 (KR) ........................ 10-2011-0135026

(51) Int. Cl.
*G05D 23/00* (2006.01)
*C21D 11/00* (2006.01)
(Continued)

(52) U.S. Cl.
CPC .............. *C21D 11/005* (2013.01); *C21D 9/52* (2013.01); *C21D 9/573* (2013.01); *C21D 9/5735* (2013.01); *G05D 23/19* (2013.01); *C21D 1/667* (2013.01)

(58) Field of Classification Search
CPC .......... C21D 9/573; C21D 1/667; C21D 9/46; C21D 11/005; C21D 1/613; C21D 8/0226;
(Continued)

(56) References Cited

U.S. PATENT DOCUMENTS 3,724,826 A * 4/1973 Kubotera ............... C21D 9/573
134/64 R
4,139,139 A * 2/1979 Hiraoka ................ B21C 37/083
228/102
(Continued)

FOREIGN PATENT DOCUMENTS

CN    101899563 A    12/2010
JP    57-060030      4/1982
(Continued)

*Primary Examiner* — Darrin Dunn
(74) *Attorney, Agent, or Firm* — The Webb Law Firm (57) ABSTRACT

Provided are a method and apparatus for uniformly controlling the strip temperature of the rapid cooling section of a continuous annealing line. A plurality of sets of cooling nozzle blocks for controlling the strip temperature is installed at the front and back sides of the strip, and is divided into lengthwise flow control nozzle blocks and widthwise flow control nozzle blocks. Strip center temperature meters and widthwise direction temperature meters are installed at the intake and discharge sides of the rapid cooling section. Temperatures obtained using the strip center temperature meters and the width direction temperature meters are used to respectively control the spraying of mist for the lengthwise flow control nozzle blocks and the widthwise flow control nozzle blocks in order to uniformly control the strip temperature and minimize changes in the flatness of the strip. The widthwise temperature meters at the intake and discharge ends of the rapid cooling section of the continuous annealing line are used to detect the temperature. Feedback/feedforward control technique can be used to (Continued)

uniformly control the widthwise temperature of the strip through flow rate control over mist sprayed in the widthwise direction of the rapid cooling section.

6 Claims, 6 Drawing Sheets

(51) Int. Cl.
  *C21D 9/573* (2006.01)
  *C21D 9/52* (2006.01)
  *G05D 23/19* (2006.01)
  *C21D 1/667* (2006.01)

(58) Field of Classification Search
  CPC ... C21D 9/48; C21D 9/56; C21D 1/60; C21D 8/0215; C21D 8/0252; C21D 8/0263; C21D 8/0426; C21D 8/0452; C21D 8/0463; C21D 8/1222; C21D 9/5735; B21B 45/0218; B21B 1/26; B21B 1/466; B21B 45/0233; B21B 13/22; B21B 1/46; B21B 1/463; B21B 2015/0057; B21B 2015/0064; B21B 2275/06; B21B 37/76; B21B 38/006; B21B 39/006; B21B 39/084; B21B 45/004; B21B 45/008; B22D 11/066; B22D 11/0665; B22D 11/16; B22D 11/22; B22D 11/225
  See application file for complete search history.

(56) References Cited

U.S. PATENT DOCUMENTS

| | | | | |
|---|---|---|---|---|
| 4,415,381 A * | 11/1983 | Tani | C21D 9/46 | 148/500 |
| 4,440,583 A * | 4/1984 | Ikegami | C21D 11/005 | 148/500 |
| 4,658,882 A * | 4/1987 | Oba | B21B 1/466 | 164/414 |
| 4,774,998 A * | 10/1988 | Matsushita | B22D 11/16 | 164/154.5 |
| 4,785,646 A * | 11/1988 | Uekaji | B21B 37/44 | 72/201 |
| 4,826,138 A * | 5/1989 | Coleman | C21D 9/573 | 266/115 |
| 4,923,396 A * | 5/1990 | Harada | C21D 9/63 | 266/102 |
| 5,137,586 A * | 8/1992 | Klink | C21D 1/767 | 148/529 |
| 5,186,018 A * | 2/1993 | van Ditzhuijzen | B21B 45/0233 | 266/113 |
| 6,054,095 A * | 4/2000 | Minato | C21D 1/613 | 266/113 |
| 6,056,041 A * | 5/2000 | Caron | B22D 11/049 | 164/154.7 |
| 6,062,056 A * | 5/2000 | Groch | B21B 45/0233 | 72/201 |
| 6,615,633 B1 * | 9/2003 | Akashi | B21B 37/44 | 72/11.3 |
| 6,712,122 B2 * | 3/2004 | Suzuki | B22D 11/182 | 164/151.5 |
| 6,913,659 B2 * | 7/2005 | Oogushi | C21D 9/573 | 148/661 |
| 6,945,306 B2 * | 9/2005 | Duncan | B05B 7/224 | 164/271 |
| 8,490,419 B2 * | 7/2013 | Zrodnikov | F28C 3/005 | 62/121 |
| 8,573,015 B2 * | 11/2013 | Otsuka | B21B 37/32 | 700/153 |
| 8,864,921 B2 * | 10/2014 | Wu | C21D 1/42 | 148/533 |
| 8,881,568 B2 * | 11/2014 | Nakata | B21B 45/0233 | 266/113 |
| 9,211,574 B2 * | 12/2015 | Akashi | B21B 1/26 | |
| 9,459,220 B2 * | 10/2016 | Yamada | C23C 2/06 | |
| 2002/0117290 A1 * | 8/2002 | Ebisu | B22D 11/16 | 164/466 |
| 2005/0172916 A1 * | 8/2005 | Sundholm | F02M 25/028 | 123/25 G |
| 2006/0029742 A1 * | 2/2006 | Cesak | B05B 7/0458 | 427/398.1 |
| 2007/0074794 A1 * | 4/2007 | Fujibayashi | B21B 45/0218 | 148/645 |
| 2008/0083525 A1 * | 4/2008 | Schlichting | B22D 11/0665 | 164/463 |
| 2008/0198900 A1 * | 8/2008 | Myhre | B22D 11/225 | 374/179 |
| 2008/0237516 A1 * | 10/2008 | Hansson | B41F 7/30 | 251/129.01 |
| 2009/0077955 A1 * | 3/2009 | Reinhold | F01N 3/18 | 60/295 |
| 2009/0084517 A1 * | 4/2009 | Thomas | B22D 11/066 | 164/454 |
| 2009/0121396 A1 * | 5/2009 | Serizawa | B21B 45/0218 | 266/44 |
| 2009/0211670 A1 * | 8/2009 | Fujibayashi | B21B 45/0218 | 148/661 |
| 2010/0024505 A1 * | 2/2010 | Ueoka | B21B 45/0233 | 72/202 |
| 2010/0044932 A1 * | 2/2010 | Sugano | C21D 1/42 | 266/111 |
| 2010/0095722 A1 * | 4/2010 | Nishiura | B21B 1/26 | 72/12.2 |
| 2010/0116380 A1 * | 5/2010 | Seidel | B21B 1/466 | 148/567 |
| 2010/0175452 A1 * | 7/2010 | Ohlert | C21D 8/0226 | 72/200 |
| 2010/0192658 A1 * | 8/2010 | Ueoka | B21B 45/0218 | 72/342.5 |
| 2010/0275667 A1 * | 11/2010 | Seidel | B21B 1/46 | 72/127 |
| 2011/0005285 A1 * | 1/2011 | Otsuka | B21B 37/32 | 72/8.9 |
| 2011/0067835 A1 * | 3/2011 | Blejde | B22D 11/0622 | 164/480 |
| 2011/0103426 A1 * | 5/2011 | Narihara | B21O 51/00 | 374/121 |
| 2011/0162427 A1 * | 7/2011 | Nakata | B21B 45/0233 | 72/201 |
| 2011/0266725 A1 * | 11/2011 | Mehrain | C21D 9/46 | 266/44 |
| 2011/0270433 A1 * | 11/2011 | Claveroulas | C21D 1/667 | 700/110 |
| 2012/0024435 A1 * | 2/2012 | Mathies | C21D 8/0242 | 148/645 |
| 2012/0067470 A1 * | 3/2012 | Serizawa | B21B 45/0218 | 148/661 |
| 2012/0151981 A1 * | 6/2012 | Yoshii | B21B 37/76 | 72/201 |
| 2012/0298224 A1 * | 11/2012 | Imanari | B21B 37/74 | 137/551 |
| 2013/0327322 A1 * | 12/2013 | Bentvelsen | A61M 11/005 | 128/200.16 |
| 2015/0047758 A1 * | 2/2015 | Hino | C21D 9/46 | 148/661 |
| 2015/0204732 A1 * | 7/2015 | Honda | B22D 11/124 | 374/161 |

FOREIGN PATENT DOCUMENTS

| | | |
|---|---|---|
| JP | 57-136444 | 8/1982 |
| JP | 5890314 A | 5/1983 |
| JP | 59-059835 | 4/1984 |
| JP | 62-267466 | 11/1987 |
| JP | 03-207821 | 9/1991 |
| JP | 05202425 A | 8/1993 |
| JP | H05202425 A | 8/1993 |
| JP | 05228525 A | 9/1993 |
| JP | 06-116655 | 4/1994 |

(56) References Cited

FOREIGN PATENT DOCUMENTS

| | | |
|---|---|---|
| JP | 08-013046 | 1/1996 |
| JP | 0813046 A | 1/1996 |
| JP | 3069494 B2 | 7/2000 |
| JP | 2003-277834 | 10/2003 |
| JP | 4102130 B2 | 6/2008 |
| JP | 4290430 B2 | 7/2009 |
| KR | 1019980035336 A | 8/1998 |
| KR | 100368211 B1 | 1/2003 |
| KR | 1020030054513 | 7/2003 |
| KR | 20040047308 A | 6/2004 |
| KR | 1020050051023 | 11/2005 |
| KR | 100679081 B1 | 1/2007 |

* cited by examiner

Moving direction of strip

METHOD AND APPARATUS FOR CONTROLLING THE STRIP TEMPERATURE OF THE RAPID COOLING SECTION OF A CONTINUOUS ANNEALING LINE

CROSS-REFERENCE TO RELATED APPLICATIONS

This application is the United States national phase of International Application No. PCT/KR2012/010776 filed Dec. 12, 2012, and claims priority to Korean Patent Application No. 10-2011-0135026 filed Dec. 15, 2011, the disclosures of which are hereby incorporated in their entirety by reference.

TECHNICAL FIELD

The present invention relates, in general, to a method and apparatus for uniformly controlling a strip temperature in a rapid cooling section of a continuous annealing line and, more particularly, to a method and apparatus for uniformly controlling a strip temperature in a rapid cooling section of a continuous annealing line, in which widthwise temperatures of the strip are measured in intake and discharge ends of the rapid cooling section of the continuous annealing line, and widthwise flow rate control over mist is carried out using a feedback/feedforward control technique, whereby the widthwise temperature of the strip is uniformly controlled and changes in the flatness of the strip are minimized.

BACKGROUND ART

Figure 1:
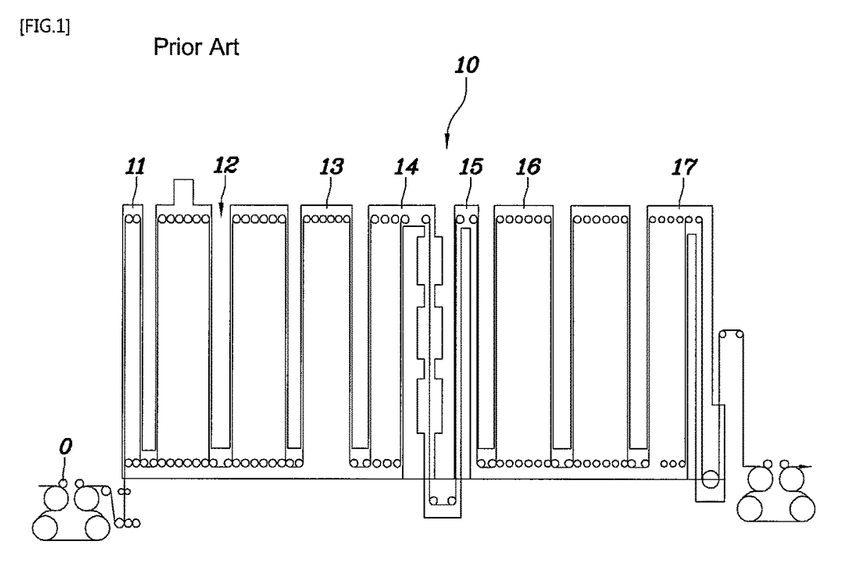
FIG. 1 is a view showing the overall configuration of a typical continuous annealing line.

FIG. 1 shows the configuration of a furnace of a continuous annealing line which is provided in an integrated steelworks.

In the furnace 10 of the continuous annealing line, the temperature of a strip introduced into the intake side of the furnace 10 is increased as the strip is preheated in a preheating section 11 using gas discharged from a heating section 12 and is indirectly heated via radiant tubes in the heating section 12.

The strip that has passed through the heating section 12 is heat-treated at a uniform temperature in a uniformly-heating section 13, and is slowly cooled in a slow cooling section 14 through circulation cooling of an atmospheric gas.

In addition, the strip that has passed through the slow cooling section 14 is cooled in a rapid cooling section 15 using a main gasket, a cooling role and an auxiliary gasket, is subjected to overaging in an overaging section 16, and is cooled in a final cooling section 17.

In the above-mentioned furnace 10 of the continuous annealing line, grains inside the strip are recovered and recrystallized in the preheating section 11 and the heating section 12 and grow in the uniformly-heating section 13.

In addition, the solubility of dissolved carbon is increased in the slow cooling section 14 where the temperature of the strip is lowered, and the dissolved carbon is supersaturated in the rapid cooling section 15. A carbide ($Fe_3C$) produced through the supersaturation of the dissolved carbon precipitates in the overaging section 16.

As methods of controlling the strip temperature in the rapid cooling section 15 of the furnace 10 of the continuous annealing line, several technologies have been proposed in the related art.

One of the several technologies of the related art was disclosed in Korean Laid-Open Patent Publication No. 2005-0051023, titled "METHOD OF CONTROLLING COOLING RATE OF STRIP IN RAPID COOLING SECTION OF CONTINUOUS ANNEALING LINE."

This method of the related art relates to a method of controlling the cooling rate of a strip in a cooling section of a continuous annealing line. According to this method, cold rolled steel sheets having uniform quality can be produced since the cooling rate and the carbon concentration of the strip that passes through the rapid cooling section can be uniformly maintained.

In addition, "APPARATUS FOR COOLING STRIP IN ANNEALING FURNACE" disclosed in Korean Laid-Open Patent Publication No. 2004-0047308 relates to an apparatus for uniformly cooling a strip subjected to processing in a rapid cooling section of an annealing furnace such that the strip is cooled to a target temperature. This invention intended to provide uniform cooling using roll cooling in which cooling water is supplied to a roll.

Furthermore, "COOLING CONTROL METHOD FOR STRIP IN COOLING SECTION OF CONTINUOUS ANNEALING FURNACE" disclosed in Korean Laid-Open Patent Publication No. 2003-0054513 proposed a method of controlling the cooling of a strip by controlling variations in the power of a cooling fan in a cooling section of a continuous annealing furnace.

However, all of these technologies of the related art are intended to control the lengthwise temperature of the strip, and it is therefore impossible to control the widthwise temperature of the strip.

Accordingly, the present invention has been made keeping in mind the above problems occurring in the prior art, and an object of the present invention is to provide a method and apparatus for uniformly controlling a strip temperature in a rapid cooling section of a continuous annealing line which can control the widthwise temperature distribution of a strip which moves in the vertical direction such that the widthwise temperature distribution has an intended profile, thereby eventually minimizing flatness defects which would otherwise occur due to non-uniform cooling of the strip.

Another object of the present invention is to provide a method and apparatus for uniformly controlling a strip temperature in a rapid cooling section of a continuous annealing line which can measure the temperature using widthwise thermometers in intake and discharge ends of the rapid cooling section of the continuous annealing line and uniformly control the widthwise temperature of the strip through flow rate control over mist sprayed in the rapid cooling section using a feedback/feedforward control technique, thereby minimizing changes in the flatness of the strip.

SUMMARY OF THE INVENTION

In order to accomplish the above objects, the present invention provides a method of uniformly controlling a strip temperature in a rapid cooling section of a continuous annealing line. The method includes the following steps of: determining valve open ratios of lengthwise flow control nozzle blocks and widthwise flow control nozzle blocks, the nozzle blocks spraying mist to front and rear sides of a strip, based on strip temperature measurement values and strip information; determining opening compensation values of the lengthwise flow control nozzle blocks such that the flow rates of the spray mist are adjusted by deducing an actual discharge-side temperature of the strip at every period from a target discharge-side temperature of the strip with respect to the determined valve open ratios; and determining opening values of a plurality of servo valves of the widthwise flow control nozzle blocks such that the flow rates of the spray mist are adjusted in a plurality of areas in a widthwise direction of the strip with respect to the determined valve open ratios, whereby the strip temperature is uniformly controlled through flow rate control over the mist sprayed to the strip, and changes in flatness of the strip are minimized.

Also provided is an apparatus for uniformly controlling a strip temperature in a rapid cooling section of a continuous annealing line. The apparatus includes: strip center temperature meters and widthwise temperature meters which measure temperatures from a strip in an intake side of a rapid cooling section; a plurality of sets of lengthwise flow control nozzle blocks which is vertically disposed at front and rear sides of the strip for temperature control over the strip; and a plurality of sets of widthwise flow control nozzle blocks which controls flow rates of mist that is sprayed to a plurality of areas of the strip, the plurality of areas being divided along a width of the strip, using a plurality of servo valves such that the flow rates of the mist sprayed in a widthwise direction of the strip differ from each other, thereby uniformly controlling a widthwise temperature of the strip. The flow rates of the mist sprayed from the lengthwise flow control nozzle blocks and the widthwise flow control nozzle blocks are controlled using temperature values measured using the strip center temperature meters and widthwise temperature meters, whereby the temperature of the strip is uniformly controlled and changes in flatness of the strip are minimized.

It is preferred that the widthwise flow control nozzle blocks be configured to divide the width of the strip into the plurality of areas and respectively control the flow rates of the mist sprayed to the plurality of areas using the plurality of servo valves.

In the method and apparatus for uniformly controlling a strip temperature in a rapid cooling section of a continuous annealing line according to the present invention, a plurality of lengthwise flow control nozzle blocks and a plurality of widthwise flow control nozzle blocks are disposed at front and rear sides of a strip and are divided from each other. The flow rates of mist sprayed from the lengthwise flow control nozzle blocks and the widthwise flow control nozzle blocks are respectively controlled using temperature values measured using the strip center temperature meters and the widthwise temperature meters disposed in the intake side of the rapid cooling section, such that the widthwise temperature distribution of the strip which moves in the vertical direction can have an intended profile. Accordingly, it is possible to achieve an excellent effect in that flatness defects in the strip that would otherwise occur due to non-uniform cooling can be minimized.

In addition, in the method and apparatus for uniformly controlling a strip temperature in a rapid cooling section of a continuous annealing line according to the present invention, temperature values are measured using the widthwise thermometers in the intake and discharge ends of the rapid cooling section of the continuous annealing line, and the widthwise temperature of the strip can be uniformly controlled through widthwise flow rate control over mist sprayed in the rapid cooling section using the feedback/feedforward control technique. Accordingly, it is possible to achieve an excellent effect in that flatness defects in the strip can be minimized.

DETAILED DESCRIPTION OF THE INVENTION

Hereinafter exemplary embodiments of the present invention will be described in greater detail with reference to the accompanying drawings.

A method and apparatus for uniformly controlling a strip temperature in a rapid cooling section of a continuous annealing line according to the present invention can measure temperatures using thermometers in an intake end and a discharge end of the rapid cooling section of the continuous annealing line and perform uniform cooling control over the temperature of the strip through flow rate control over spray mist based on feedback/feedforward control technique, thereby minimizing changes in the flatness of the strip.

Figure 2:
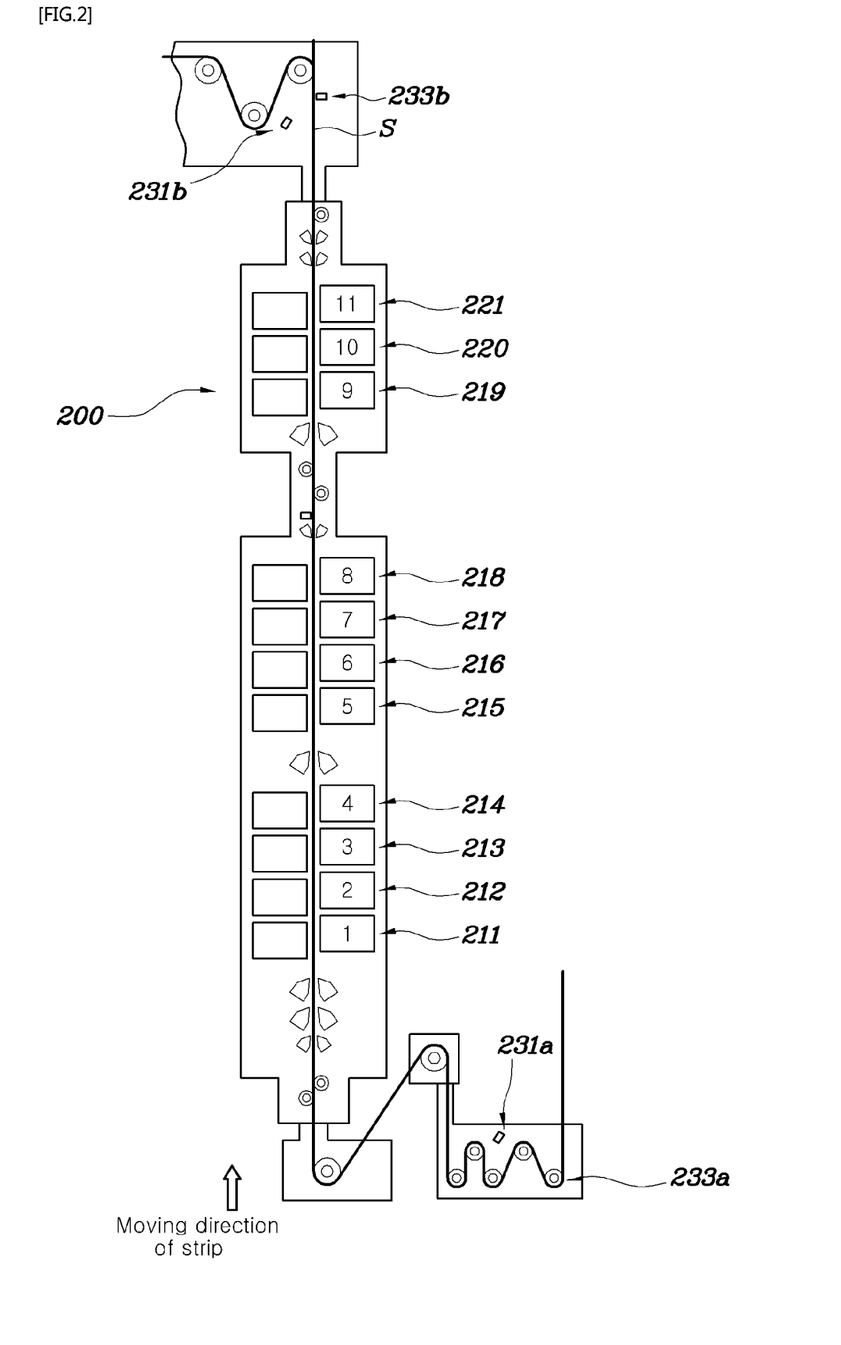
FIG. 2 is a cross-sectional view specifically showing a rapid cooling section of a continuous annealing line to which an apparatus for controlling a strip temperature in a rapid cooling line of a continuous annealing line according to the present invention is applied.

First, a description will be given below of an apparatus 100 for uniformly controlling a strip temperature in a rapid cooling section of a continuous annealing line according to the present invention with reference to the drawings.

the apparatus for uniformly controlling a strip temperature in a rapid cooling section of a continuous annealing line according to the present invention includes a plurality of sets of cooling nozzle blocks which is vertically disposed at the front and rear sides of the strip in order to control the temperature of the strip. The plurality of sets of cooling nozzle blocks is divided into lengthwise flow rate control nozzle blocks and widthwise flow control nozzle blocks.

In a rapid cooling section 200 of a continuous annealing line to which this apparatus for uniformly controlling a strip temperature in a rapid cooling section of a continuous annealing line according to the present invention is applied, 11 sets of cooling nozzle blocks are arranged in the vertical direction. Among the 11 sets of cooling nozzle blocks, 6 sets are the lengthwise flow control nozzle blocks, and 5 sets are the widthwise flow control nozzle blocks. Each of the 11 sets of cooling nozzle blocks is disposed at the front and rear sides of the strip such that the strip S passes between each set of cooling nozzle blocks.

That is, the lengthwise flow control nozzle blocks include #1 blocks 211, #2 blocks 212, #5 blocks 215, #6 blocks 216, #9 blocks 219 and #10 blocks 220 which are sequentially arranged from the intake side of the rapid cooling section 220. The widthwise flow control nozzle blocks include #3 blocks 213, #4 blocks 214, #7 blocks 217, #8 blocks 218 and #11 blocks 221 which are sequentially arranged from the intake side of the rapid cooling section 220. The lengthwise and widthwise flow control nozzle blocks arranged in this manner serve to uniformly control the temperature of the strip S.

Figure 5:
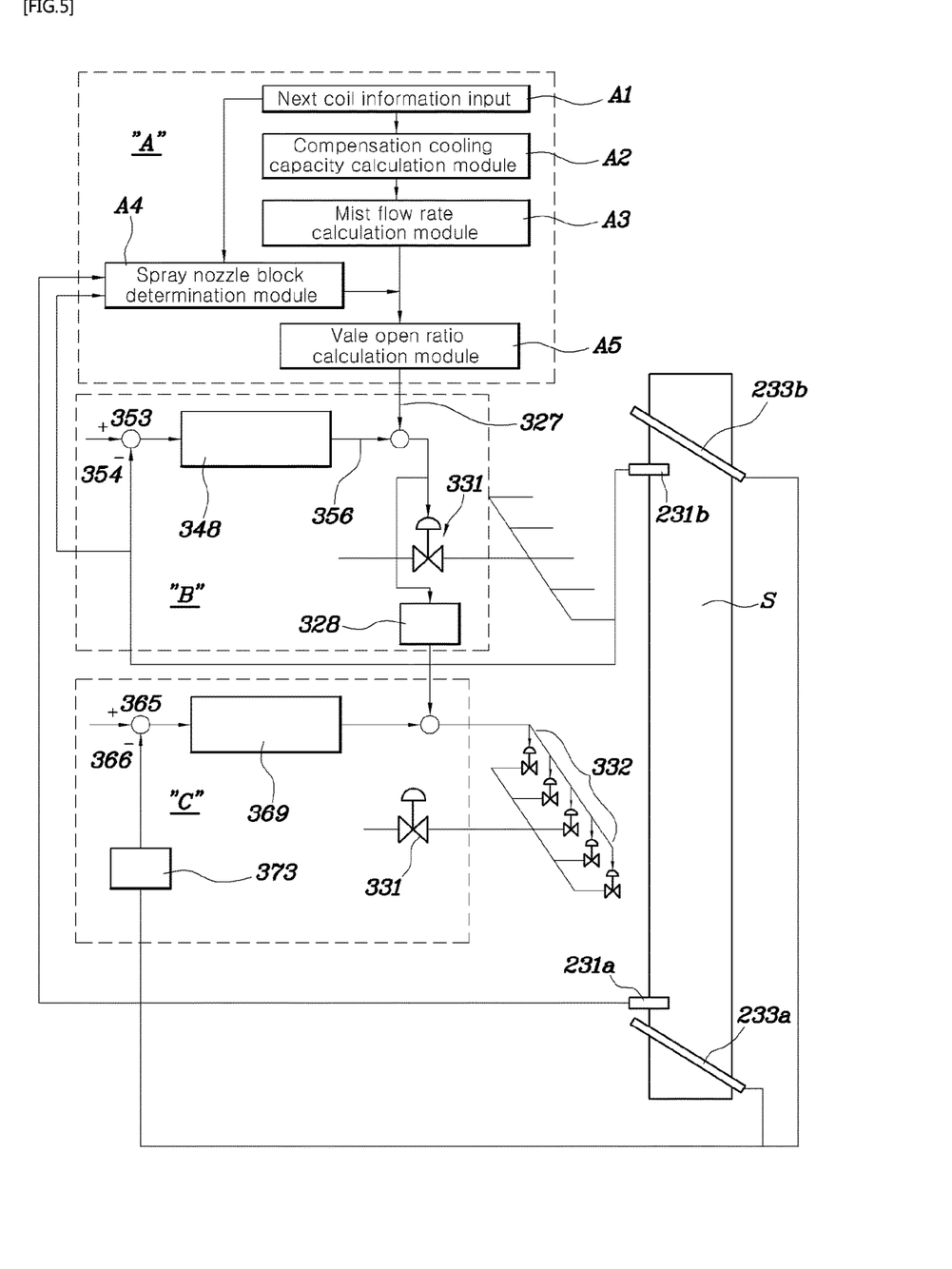
FIG. 5 is an overall explanatory view showing a method of controlling a strip temperature in a rapid cooling section of a continuous annealing line according to the present invention.

As shown in FIG. 5, the apparatus for uniformly controlling a strip temperature in a rapid cooling section of a continuous annealing line according to the present invention includes strip center temperature meters 231a and 231b and widthwise temperature meters 233a and 233b at the intake and discharge sides of the rapid cooling section 200.

According to the present invention, the strip center temperature meters 231a and 231b and the widthwise temperature meters 233a and 233b are respectively disposed in the rapid cooling section 200 for the temperature control over the strip, and the actual temperature values of the strip are measured using these meters.

This apparatus for uniformly controlling a strip temperature in a rapid cooling section of a continuous annealing line according to the present invention controls the flow rates of spray mist of the lengthwise flow control nozzle blocks and the widthwise flow control nozzle blocks based on the temperature values measured using the strip center temperature meters 231a and 231b and the widthwise temperature meters 233a and 233b.

The rapid cooling section 200 according to the present invention is required to have different cooling rates (° C./sec) depending on the steel type and size of the strip that is produced, and thus control for determining the flow rates of the total 11 sets of nozzle blocks is required.

Figure 4:
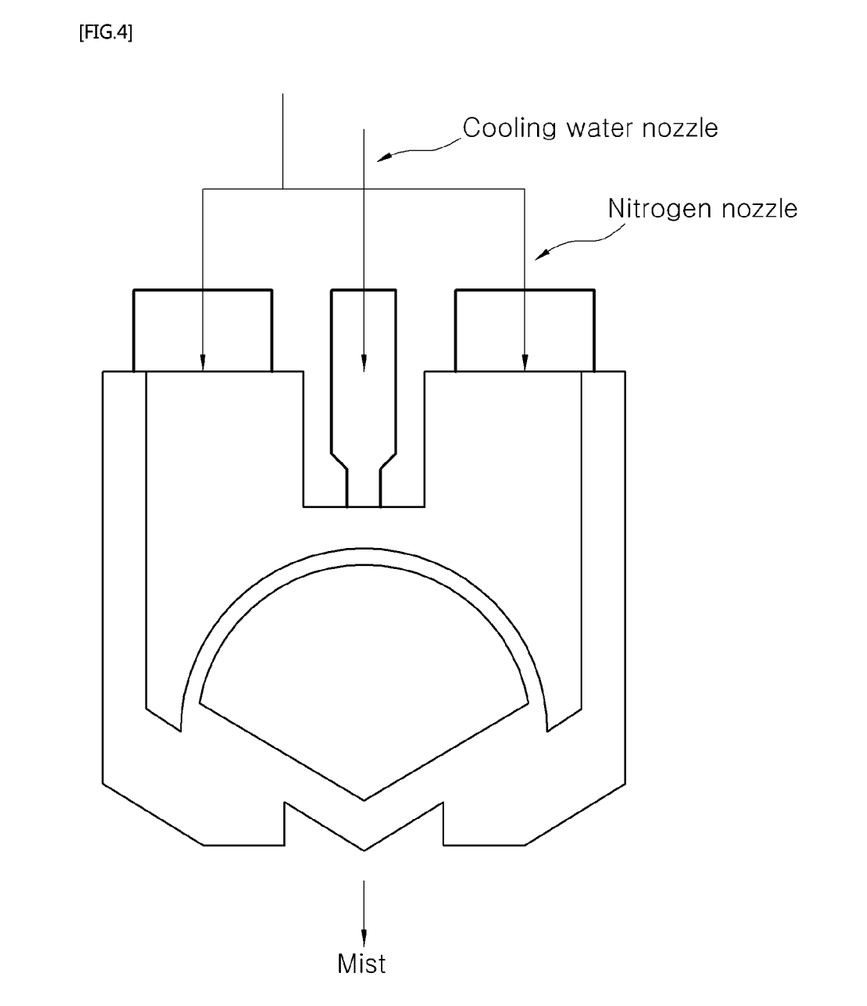
FIG. 4 is a detailed view showing a mist spray nozzle of the split spray nozzle block shown in FIG. 3.

A cooling medium for the strip sprayed from the nozzle blocks is mist. As shown in FIG. 4, nitrogen and cooling water are mixed inside the nozzles before being sprayed as the mist.

The lengthwise flow control nozzle blocks disposed in the rapid cooling section 200 are the #1 blocks 211, the #2 blocks 212, the #5 blocks 215, the #6 blocks 216, the #9 blocks 219 and the #10 blocks 220 which are sequentially arranged from the intake side of the rapid cooling section 200. As shown in FIG. 5, the flow rate of the mist is controlled by adjusting a main valve 331 of each of the blocks.

Figure 3:
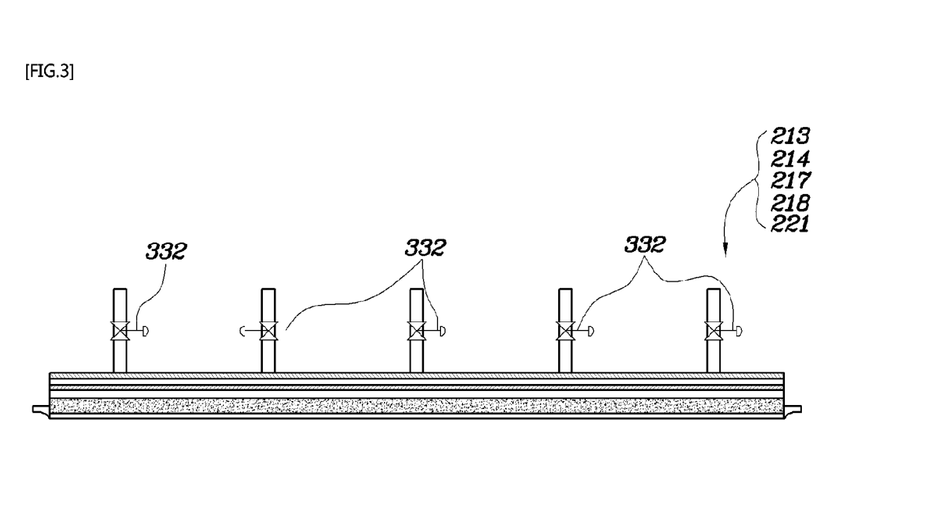
FIG. 3 is a configuration view showing a widthwise split spray nozzle block which is provided in the rapid cooling section according to the present invention.

In addition, the widthwise flow control nozzle blocks are the #3 blocks 213, the #4 blocks 214, the #7 blocks 217, the #8 blocks 218 and the #11 blocks 221. As shown in FIG. 3 and FIG. 5, the flow rates of a plurality of areas, more preferably, five areas divided in the widthwise direction of the strip at the rear end of the main valve 331 of each of the blocks are respectively controlled using servo valves 332.

The 5 sets of servo valves 332 are provided in the widthwise flow control nozzle blocks. As shown in FIG. 3, at each of the positions of the #3 blocks 213, the #4 blocks 214, the #7 blocks 217, the #8 blocks 218 and the #11 blocks 221 disposed in the rapid cooling section 200 of the continuous annealing line, the 5 sets of servo valves 332 are divided in the widthwise direction of the strip. Valve opening compensation values are determined, and the 5 sets of servo valves spray different flow rates of mist.

In this manner, the apparatus for uniformly controlling a strip temperature in a rapid cooling section of a continuous annealing line according to the present invention can uniformly control the temperature of the strip by controlling the flow rates of the spray mist in the rapid cooling section 200, thereby minimizing changes in the flatness of the strip.

A more detailed description will be given of a method 300 of uniformly controlling a strip temperature in a rapid cooling section of a continuous annealing line according to the present invention which controls the cooling temperature of a strip using the above-mentioned apparatus 100 for uniformly controlling a strip temperature in a rapid cooling section of a continuous annealing line according to the present invention.

The method of uniformly controlling a strip temperature in a rapid cooling section of a continuous annealing line according to the present invention controls the flow rates of mist sprayed from the lengthwise flow control nozzle blocks and the widthwise flow control nozzle blocks based on the temperature values measured using the strip center temperature meters 231a and 231b and the widthwise temperature meters 233a and 233b.

As shown in FIG. 5, the method of uniformly controlling a strip temperature in a rapid cooling section of a continuous annealing line according to the present invention calculates the flow rates of spray mist based on the temperature values measured using the strip center temperature meters and the widthwise temperature meters, and controls the flow rates of spray mist of the lengthwise flow control nozzle blocks and the widthwise flow control nozzle blocks.

The method of uniformly controlling a strip temperature in a rapid cooling section of a continuous annealing line according to the present invention is executed by a control computer (not shown) provided in the continuous annealing line. The control computer automatically executes calculation based on a variety of mathematical formulae stored in a variety of modules which are built inside the control computer.

First, the method of uniformly controlling a strip temperature in a rapid cooling section of a continuous annealing line according to the present invention carries out step "A" of determining valve open ratios of the plurality of lengthwise flow control nozzle blocks and the plurality of widthwise flow control nozzle blocks which are vertically arranged at the front and rear sides of the strip, based on the temperature values measured using the strip center temperature meters 231a and 231b and the widthwise temperature meters 233a and 233b disposed at the intake side of the rapid cooling section 200.

As shown in FIG. 5, this step "A" of determining valve open ratios of the lengthwise flow control nozzle blocks and the widthwise flow control nozzle blocks includes a step of receiving information on the thickness, width and steel type of the strip from a next coil information input module disposed inside the control computer (not shown) and step A2 of receiving the present intake-side and discharge-side temperatures of the strip from the strip center temperature meters 231a and 231b and calculating a compensation cooling capacity from a target temperature of the strip at a compensation cooling capacity calculation module, based on the equation presented by Formula 3=Formula 1−Formula 2:

$$\dot{Q}_{s\_act} = \rho_s C_{ps}(T_{o\_act} - T_{i\_act})\dot{V}_s \quad \text{Formula 1,}$$

where $\dot{Q}_{s\_act}$ is the present cooling capacity (W/m$^3$·K) of the strip, $\rho_s$ is the density (Kg/m$^3$) of the strip, $C_{ps}$ is the specific heat (J/Kg·K) of the strip, $T_{o\_act}$ is the actual absolute temperature (K) of an RCS discharge-side plate, and $\dot{V}_s$ is the volume ratio (m$^3$/sec) of the strip, $$\dot{Q}_{s\_target} = \rho_s C_{ps}(T_{o\_target} - T_{i\_act})\dot{V}_s \qquad \text{Formula 2,}$$

where $\dot{Q}_{s\_target}$ is the target cooling capacity (W/m$^3$·K) of the strip, $\rho_s$ is the density (Kg/m$^3$) of the strip, $C_{ps}$ is the specific heat (J/Kg·K) of the strip, $T_{o\_target}$ is the target absolute temperature (K) of a discharge-side plate, $T_{i\_act}$ is the actual absolute temperature (K) of an RCS intake-side plate, and $\dot{V}_s$ is the volume ratio (m$^3$/sec) of the strip, and $$\Delta\dot{Q}_s = \rho_s C_{ps}(T_{o\_target} - T_{o\_act})\dot{V}_s \qquad \text{Formula 3,}$$

where $\Delta\dot{Q}_s$ is the compensation cooling capacity (W/m$^3$·K) of the strip.

Afterwards, step A3 of calculating a flow rate value of mist using Formula 5 obtained from Formula 4 below is carried out.

$$\Delta\dot{Q}_s = (C_{pm}\Delta T_m + h_{fg})\rho_m \dot{V}_m, \qquad \text{Formula 4}$$

and $$\dot{V}_m = \frac{\Delta\dot{Q}_s}{(C_{pm}\Delta T_m + h_{fg})\rho_m}, \qquad \text{Formula 5}$$

where $C_{pm}$ is the specific heat (J/Kg·K) of mist, $\Delta T_m$ is the temperature variation (K) of mist, $h_{fg}$ is the phase transformation capacity (J/Kg) of mist, and $\dot{V}_m$ is the flow rate (volume ratio) (m$^3$/sec) of mist.

Afterwards, the flow rate value of mist is divided by the number of blocks that is predetermined by a spray nozzle block determination module of the control computer (step A4), the divided flow rate value is used as an input value of a valve open ratio calculation module, and a valve flow rate coefficient $C_v$ is calculated from this value using Formula 6 below.

$$\dot{V}_m = C_v\sqrt{\Delta P} \qquad \text{Formula 6,}$$

where $C_v$ is the valve flow rate coefficient (m$^3$/hr), and $\Delta P$ is a valve pressure (Kg/cm$^2$).

Step A5 of determining the valve open ratio of each final block below is carried out using the valve flow rate coefficient $C_v$ using Formula 7 below.

$$\alpha = f(C_v) \qquad \text{Formula 7,}$$

where α is the valve open ratio (%).

At a point where the coil is changed, the valve open ratio determined through the above-described steps becomes an initial valve opening value 327 of the lengthwise flow control nozzle blocks at step "B" that will be described later.

In addition, as for the widthwise flow control nozzle blocks at step "C" that will be described later, a value 328 obtained by dividing the valve opening value with 5 becomes the valve opening value of the widthwise flow control nozzle blocks.

Afterwards, the method 300 of uniformly controlling a strip temperature in a rapid cooling section of a continuous annealing line according to the present invention carries out step "B" of determining opening compensation values 356 for the lengthwise flow control nozzle blocks by deducing an actual strip discharge-side temperature at every period from a target discharge-side temperature of the strip with respect to the above-determined valve open ratios.

Step "B" is the step of determining the opening compensation values 356 for the lengthwise flow control nozzle blocks by deducing the actual strip discharge-side temperature 354 at every period from the target discharge-side temperature 353 of the strip with respect to the valve open ratios determined at step A5. Step "B" is carried out using a lengthwise temperature controller 348 including a proportional integration controller 348a.

Figure 6:
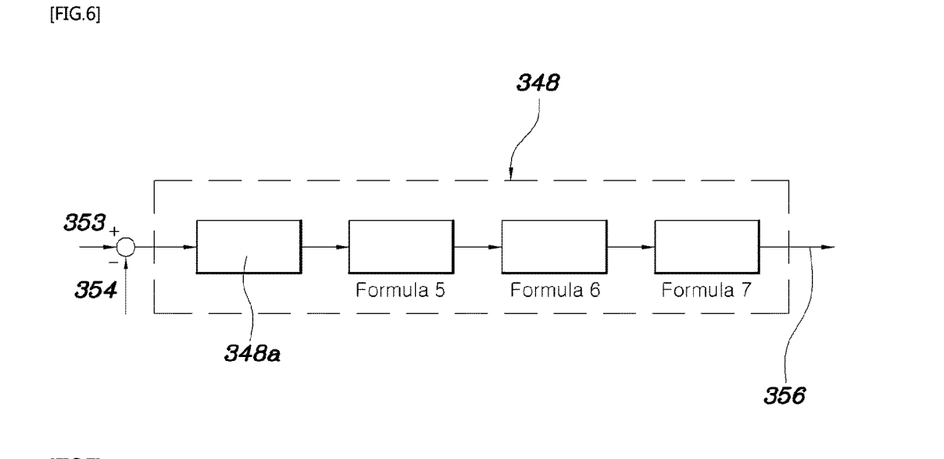
FIG. 6 is a configuration view showing a lengthwise discharge-side temperature controller used in the method of controlling a strip temperature in a rapid cooling section of a continuous annealing line according to the present invention.

FIG. 6 shows a detailed configuration of the lengthwise temperature controller 348. Specifically, the lengthwise temperature controller 348 calculates the opening compensation values 356 by setting the value obtained by deducing the actual discharge-side temperature 354 at every period from the target discharge-side temperature 353 of the strip as an input of the lengthwise temperature controller 348.

In this process, the lengthwise temperature controller 348 calculates the flow rate of mist using Formula 5, which was also referred to in step A3.

$$\dot{V}_m = \frac{\Delta\dot{Q}_s}{(C_{pm}\Delta T_m + h_{fg})\rho_m}, \qquad \text{Formula 5}$$

where $C_{pm}$ is the specific heat (J/Kg·K) of mist, $\Delta T_m$ is the temperature variation (K) of mist, $h_{fg}$ is the phase transformation capacity (J/Kg) of mist, and $\dot{V}_m$ is the flow rate (volume ratio) (m$^3$/sec) of mist.

The flow rate coefficient $C_v$ is calculated using Formula 6, which was also referred to in step A5.

$$\dot{V}_m = C_v\sqrt{\Delta P} \qquad \text{Formula 6,}$$

where $C_v$ is the valve flow rate coefficient (m$^3$/hr), and $\Delta P$ is a valve pressure (Kg/cm$^2$).

The valve open ratios are calculated using Formula 7 below.

$$\alpha = f(C_v) \qquad \text{Formula 7,}$$

where α is the valve open ratio (%).

The opening compensation values 356 for the lengthwise flow control nozzle blocks are determined through the above-mentioned processes, and flows of mist reflecting these values are sprayed from the lengthwise flow control nozzle blocks in the #1, #2, #5, #6, #9 and #10 blocks 211, 212, 215, 216, 219 and 220 which are disposed in the rapid cooling section 200 of the continuous annealing line.

Afterwards, the method 300 of uniformly controlling a strip temperature in a rapid cooling section of a continuous annealing line according to the present invention carries out step "C" of determining the opening values of the plurality of servo valves 332 of the widthwise flow control nozzle blocks such that the flow rates of spray mist are respectively controlled in a plurality of areas in the widthwise direction of the strip S with respect to the determined valve open ratios.

At step "C," the width of the strip is divided into 5 areas for widthwise temperature control over the strip S, the 5 servo valves 332 which are divided in the widthwise direction of the strip are respectively disposed in the widthwise flow control nozzle blocks (see FIG. 3 and FIG. 5), and an actual widthwise temperature distribution value 366 of the strip at every period deduced from a target widthwise temperature distribution 365 of the strip is used as an input value of a widthwise temperature controller 369.

The widthwise temperature controller 369 calculates the opening values for the servo valves 332 of the widthwise flow control nozzle blocks by deducing the actual widthwise temperature distribution value 366 of the strip at every period from the target widthwise temperature distribution 365 of the strip with respect to the valve open ratios determined at step A5.

Figure 7:
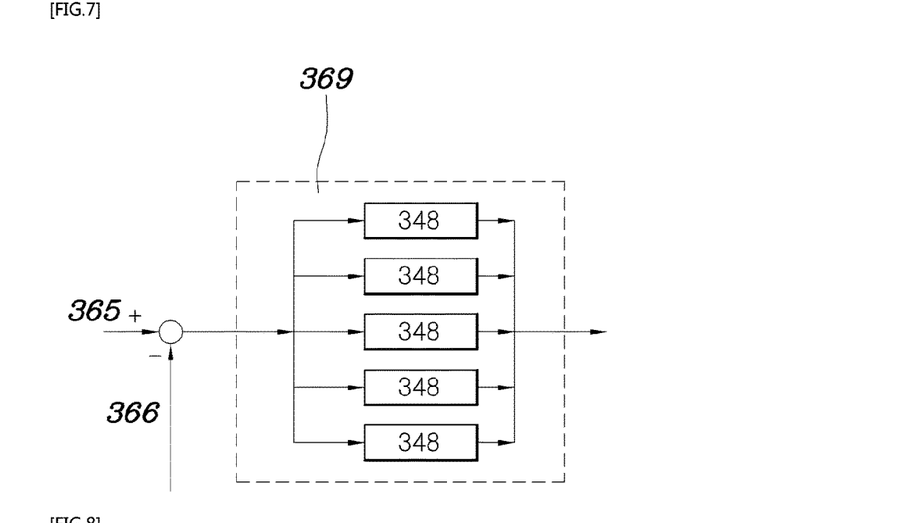
FIG. 7 is a configuration view showing a widthwise temperature controller used in the method of controlling a strip temperature in a rapid cooling section of a continuous annealing line according to the present invention.

In this process, as shown in FIG. 5 and FIG. 7, the widthwise temperature controller 369 deduces the actual widthwise temperature distribution value 366 obtained using the widthwise temperature meters 233a and 233b from the target widthwise temperature distribution 365, and calculates the opening values of the widthwise flow control nozzles using the resultant value as an input value thereof.

Figure 8:
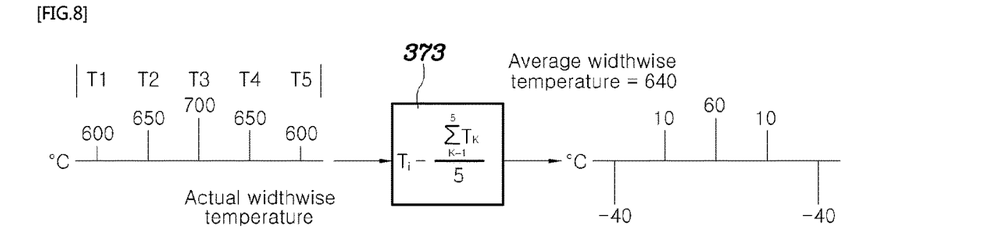
FIG. 8 is a widthwise temperature range calculation logic executed in the method of controlling a strip temperature in a rapid cooling section of a continuous annealing line according to the present invention.

FIG. 8 shows a widthwise temperature variation calculation logic embodied in the widthwise temperature control module 373 shown in FIG. 5.

A detailed configuration of the widthwise temperature controller 369 is also shown in FIG. 7. The opening values for the servo valves 332 are used the same as the control logic of the lengthwise temperature controller 348 used in step "B," and the parameter values thereof are corrected depending on the widthwise nozzles.

The widthwise temperature controller 369 calculates the flow rates of mist for the 5 servo valves using Formula 5 below.

$$\dot{V}_m = \frac{\Delta \dot{Q}_s}{(C_{pm}\Delta T_m + h_{fg})\rho_m}, \qquad \text{Formula 5}$$

where $C_{pm}$ is the specific heat (J/Kg·K) of mist,
$\Delta T_m$ is the temperature variation (K) of mist,
$h_{fg}$ is the phase transformation capacity (J/Kg) of mist, and
$\dot{V}_m$ is the flow rate (volume ratio) (m³/sec) of mist.

The valve flow rate coefficient $C_v$ is calculated using Formula 6.

$$\dot{V}_m = C_v\sqrt{\Delta P} \qquad \text{Formula 6,}$$

where $C_v$ is the valve flow rate coefficient (m³/hr), and
$\Delta P$ is a valve pressure (Kg/cm²).

The open ratios of the 5 servo valves 332 are calculated using Formula 7 below.

$$\alpha = f(C_v) \qquad \text{Formula 7,}$$

where $\alpha$ is the valve open ratio (%).

Through these processes, step "C" determines the opening compensation values for the 5 servo valves of the widthwise flow control nozzle blocks, and mist is sprayed to the 5 areas of the strip from the widthwise flow control nozzle blocks of the #3, #4, #7, #8 and #11 blocks 213, 214, 217, 218 and 221 disposed in the rapid cooling section 200 of the continuous annealing line, differently depending on the 5 servo valves 332 divided in the widthwise direction of the strip.

In the method of uniformly controlling a strip temperature in a rapid cooling section of a continuous annealing line according to the present invention, the plurality of lengthwise flow control nozzle blocks and the plurality of widthwise flow control nozzle blocks are disposed at the front and rear sides of the strip S and divided from each other, and the flow rates of mist sprayed from the lengthwise flow control nozzle blocks and the widthwise flow control nozzle blocks are controlled based on the temperature values measured using the strip center temperature meters 231a and 231b and the widthwise temperature meters 233a and 233b, which are disposed at the intake side of the rapid cooling section 200, whereby the widthwise temperature distribution of the strip, which moves in the vertical direction, is controlled such that it has an intended profile.

Accordingly, the present invention can eventually minimize flatness defects in the strip that would otherwise occur due to non-uniform cooling.

In addition, the method of uniformly controlling a strip temperature in a rapid cooling section of a continuous annealing line according to the present invention can measure the temperature using the widthwise thermometers in the intake and discharge ends of the rapid cooling section 200 of the continuous annealing line and uniformly control the widthwise temperature of the strip through flow rate control over spray mist in the rapid cooling section 200 using the feedback/feedforward control technique, thereby minimizing changes in the flatness of the strip.

Although the particular embodiment of the present invention has been described in detail with reference to the drawings for the purposes, it is not intended to limit the invention to the precise forms disclosed. A person skilled in the art can make many modifications and variations without departing from the technical principle or scope of the present invention. It should be understood, however, that such all modifications or alterations in design shall clearly fall within the scope of the invention.

100: apparatus for uniformly controlling a strip temperature in a rapid cooling section of a continuous annealing line
200: rapid cooling section 211: #1 block
212: #2 block 213: #3 block
214: #4 block 215: #5 block
216: #6 block 217: #7 block
218: #8 block 219: #9 block
220: #10 block 221: #11 block
231a, 231b: lengthwise temperature meter
233a, 233b: widthwise temperature meter
300: method of uniformly controlling a strip temperature in a rapid cooling section of a continuous annealing line
331: main valve 332: servo valve
348: lengthwise temperature controller
369: widthwise temperature controller
A: step of determining valve open ratios of lengthwise flow control nozzle blocks and widthwise flow control nozzle blocks
B: step of determining opening compensation values for lengthwise flow control nozzle blocks
C: step of determining opening values of servo valves of widthwise flow control nozzle blocks
S: strip

The invention claimed is:

1. A method of uniformly controlling a strip temperature in a rapid cooling section of a continuous annealing line, the method comprising steps of:
   determining valve open ratios of lengthwise flow control nozzle blocks and widthwise flow control nozzle blocks, the nozzle blocks spraying mist to front and rear sides of a strip, based on strip temperature measurement values and strip information;
   determining opening compensation values of the lengthwise flow control nozzle blocks such that the flow rates of the spray mist are adjusted by deducing an actual discharge-side temperature of the strip at every period from a target discharge-side temperature of the strip with respect to the determined valve open ratios; and
   determining opening values of a plurality of servo valves of the widthwise flow control nozzle blocks such that the flow rates of the spray mist are adjusted in a plurality of areas in a widthwise direction of the strip with respect to the determined valve open ratios, whereby the strip temperature is uniformly controlled through flow rate control over the mist sprayed to the strip, and changes in flatness of the strip are minimized, wherein the step of determining the valve open ratios of the lengthwise flow control nozzle blocks and the widthwise flow control nozzle blocks comprises steps of:

calculating a compensation cooling capacity from a present intake-side temperature, a discharge-side temperature and a target temperature of the strip using information on a thickness, a width and a steel type of the strip inputted from a next coil information input module;

calculating a flow rate value of the mist;

dividing the flow rate value of the mist with a number of blocks which is predetermined by a spray nozzle block determination module and calculating a valve flow rate coefficient $C_v$ using the divided flow rate value as an input value of a valve open ratios calculation module; and finally determining valve open ratios of the blocks using the valve flow rate coefficient $C_v$.

2. The method according to claim 1, wherein, at the step of calculating the compensation cooling capacity, the compensation cooling capacity is calculated using an equation presented by Formula 3=Formula 1−Formula 2:

$$\dot{Q}_{s\_act} = \rho_s C_{ps}(T_{o\_act} - T_{i\_act})\dot{V}_s \quad \text{Formula 1,}$$

where $\dot{Q}_{s\_act}$ is the present cooling capacity (W/m³·K) of the strip, $\rho_s$ is the density (Kg/m³) of the strip, $C_{ps}$ is the specific heat (J/Kg·K) of the strip, $T_{o\_act}$ is the actual absolute temperature (K) of an RCS discharge-side plate, and $\dot{V}_s$ is the volume ratio (m³/sec) of the strip, $$\dot{Q}_{s\_target} = \rho_s C_{ps}(T_{o\_target} - T_{i\_act})\dot{V}_s \quad \text{Formula 2,}$$

where $\dot{Q}_{s\_target}$ is the target cooling capacity (W/m³·K) of the strip, $\rho_s$ is the density (Kg/m³) of the strip, $C_{ps}$ is the specific heat (J/Kg·K) of the strip, $T_{o\_target}$ is the target absolute temperature (K) of a discharge-side plate, $T_{i\_act}$ is the actual absolute temperature (K) of an RCS intake-side plate, and $\dot{V}_S$ is the volume ratio (m³/sec) of the strip, and $$\Delta\dot{Q}_s = \rho_s C_{ps}(T_{o\_target} - T_{o\_act})\dot{V}_s \quad \text{Formula 3,}$$

where $\Delta\dot{Q}_s$ is the compensation cooling capacity (W/m³·K) of the strip.

3. The method according to claim 1, wherein the step of calculating the flow rate value of the mist comprises:

calculating the flow rate value of the mist using Formula 5 obtained from Formula 4 below:

$$\Delta\dot{Q}_s = (C_{pm}\Delta T_m + h_{fg})\rho_m \dot{V}_m, \quad \text{Formula 4}$$

and $$\dot{V}_m = \frac{\Delta\dot{Q}_s}{(C_{pm}\Delta T_m + h_{fg})\rho_m}, \quad \text{Formula 5}$$

where $C_{pm}$ is the specific heat (J/Kg·K) of mist, $\Delta T_m$ is the temperature variation (K) of mist, $h_{fg}$ is the phase transformation capacity (J/Kg) of mist, and $\dot{V}_m$ is the flow rate (volume ratio) (m³/sec) of mist.

4. The method according to claim 1, wherein the step of calculating the valve flow rate coefficient $C_v$ comprises calculating the flow rate coefficient $C_v$ using Formula 6 below:

$$\dot{V}_m = C_v\sqrt{\Delta P} \quad \text{Formula 6,}$$

where $C_v$ is the valve flow rate coefficient (m³/hr), and $\Delta P$ is a valve pressure (Kg/cm²), and the step of finally determining the valve open ratios of the blocks comprises finally determining the valve open ratios of the blocks using Formula 7 below:

$$\alpha = f(C_v) \quad \text{Formula 7,}$$

where $\alpha$ is the valve open ratio (%).

5. A method of uniformly controlling a strip temperature in a rapid cooling section of a continuous annealing line, the method comprising steps of:

determining valve open ratios of lengthwise flow control nozzle blocks and widthwise flow control nozzle blocks, the nozzle blocks spraying mist to front and rear sides of a strip, based on strip temperature measurement values and strip information;

determining opening compensation values of the lengthwise flow control nozzle blocks such that the flow rates of the spray mist are adjusted by deducing an actual discharge-side temperature of the strip at every period from a target discharge-side temperature of the strip with respect to the determined valve open ratios; and determining opening values of a plurality of servo valves of the widthwise flow control nozzle blocks such that the flow rates of the spray mist are adjusted in a plurality of areas in a widthwise direction of the strip with respect to the determined valve open ratios, whereby the strip temperature is uniformly controlled through flow rate control over the mist sprayed to the strip, and changes in flatness of the strip are minimized, wherein the step of determining the opening compensation values of the lengthwise flow control nozzle blocks is carried out using a lengthwise temperature controller comprising a proportional integration controller, and comprises:

calculating the flow rates of the mist using Formula 5 below:

$$\dot{V}_m = \frac{\Delta\dot{Q}_s}{(C_{pm}\Delta T_m + h_{fg})\rho_m}, \quad \text{Formula 5}$$

where $C_{pm}$ is the specific heat (J/Kg·K) of mist, $\Delta T_m$ is the temperature variation (K) of mist, $h_{fg}$ is the phase transformation capacity (J/Kg) of mist, and $\dot{V}_m$ is the flow rate (volume ratio) (m³/sec) of mist;

calculating the valve flow rate coefficient $C_v$ using Formula 6 below:

$$\dot{V}_m = C_v\sqrt{\Delta P} \quad \text{Formula 6,}$$

where $C_v$ is the valve flow rate coefficient (m³/hr), and $\Delta P$ is a valve pressure (Kg/cm²); and calculating the valve open ratios using Formula 7 below:

$$\alpha = f(C_v) \quad \text{Formula 7,}$$

where $\alpha$ is the valve open ratio (%).

6. A method of uniformly controlling a strip temperature in a rapid cooling section of a continuous annealing line, the method comprising steps of:

determining valve open ratios of lengthwise flow control nozzle blocks and widthwise flow control nozzle blocks, the nozzle blocks spraying mist to front and rear sides of a strip, based on strip temperature measurement values and strip information;

determining opening compensation values of the lengthwise flow control nozzle blocks such that the flow rates of the spray mist are adjusted by deducing an actual discharge-side temperature of the strip at every period from a target discharge-side temperature of the strip with respect to the determined valve open ratios; and determining opening values of a plurality of servo valves of the widthwise flow control nozzle blocks such that the flow rates of the spray mist are adjusted in a plurality of areas in a widthwise direction of the strip with respect to the determined valve open ratios, whereby the strip temperature is uniformly controlled through flow rate control over the mist sprayed to the strip, and changes in flatness of the strip are minimized, wherein the step of determining the opening values of the plurality of servo valves of the widthwise flow control nozzle blocks is carried out by dividing the strip into the plurality of areas, disposing the plurality of servo valves on the widthwise flow control nozzle blocks, the plurality of servo valves being divided in the widthwise direction of the strip so as to be respectively positioned in the plurality of areas, the flow rates of the plurality of servo valves being controlled by a widthwise temperature controller which deduces an actual widthwise temperature distribution value of the strip from a target widthwise temperature distribution of the strip and uses a resultant value as an input value thereof, the step of determining the opening values of the plurality of servo valves of the widthwise flow control nozzle blocks comprising:

calculating the flow rates of the mist with respect to the plurality of servo valves using Formula 5 below:

$$\dot{V}_m = \frac{\Delta \dot{Q}_s}{(C_{pm}\Delta T_m + h_{fg})\rho_m},$$ Formula 5 where $C_{pm}$ is the specific heat (J/Kg·K) of mist, $\Delta T_m$ is the temperature variation (K) of mist, $h_{fg}$ is the phase transformation capacity (J/Kg) of mist, and $\dot{V}_m$ is the flow rate (volume ratio) (m³/sec) of mist;

calculating the valve flow rate coefficient $C_v$ using Formula 6 below:

$$\dot{V}_m = C_v\sqrt{\Delta P}$$ Formula 6, where $C_v$ is the valve flow rate coefficient (m³/hr), and $\Delta P$ is a valve pressure (Kg/cm²); and calculating the valve open ratios of the plurality of servo valves using Formula 7 below:

$$\alpha = f(C_v)$$ Formula 7, where α is the valve open ratio (%).

* * * * *

UNITED STATES PATENT AND TRADEMARK OFFICE
CERTIFICATE OF CORRECTION

PATENT NO. : 9,783,867 B2
APPLICATION NO. : 14/364944
DATED : October 10, 2017
INVENTOR(S) : Gyoo Taek Lee et al.

It is certified that error appears in the above-identified patent and that said Letters Patent is hereby corrected as shown below:

In the Claims

Column 12, Line 53, Claim 5, delete "$C_p$" and insert -- $C_v$ --

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*